(No Model.)
C. MARSH.
COTTON SEED PLANTER.
No. 247,261.      Patented Sept. 20, 1881.
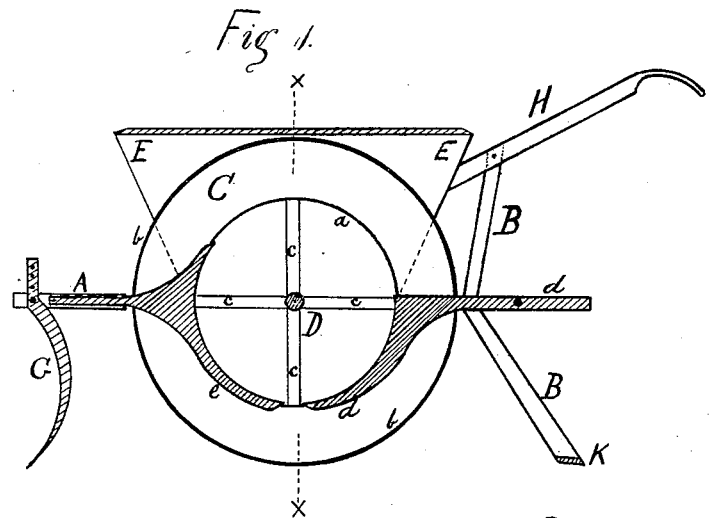
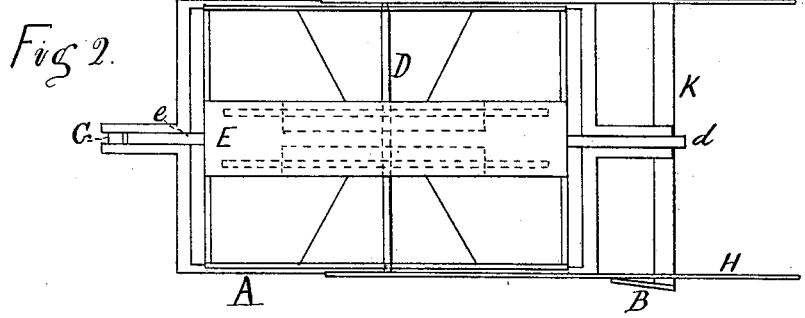
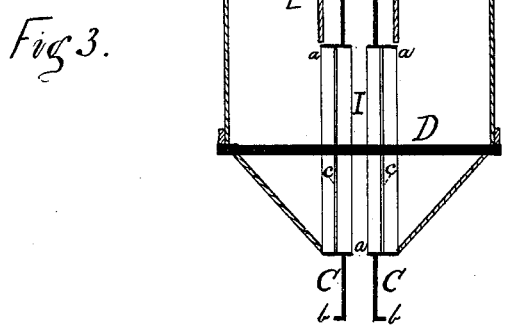
Attest,
John Buckler
A. M. Pierce.
Cyrus Marsh,
Inventor.
By Worth Osgood,
Attorney.

UNITED STATES PATENT OFFICE.

CYRUS MARSH, OF LOUISVILLE, KENTUCKY.

COTTON-SEED PLANTER.

SPECIFICATION forming part of Letters Patent No. 247,261, dated September 20, 1881.

Application filed March 3, 1881. (No model.)

*To all whom it may concern:*

Be it known that I, CYRUS MARSH, of Louisville, county of Jefferson, and State of Kentucky, have invented certain new and useful Improvements in Cotton-Seed Planters, of which the following is a full, clear, and exact description, reference being had to the accompanying drawings, and to the letters of reference marked thereon.

My invention has relation to that class of implements employed for the planting of cotton-seeds, and ordinarily denominated "cotton-seed planters;" but the improvements are applicable in other planters in many instances, as will be apparent from a consideration of the construction and operation shown and described herein.

The principal objects of my invention are to simplify and improve the general construction of the machine, rendering it simple in respect to its several parts, not likely to get out of order, easy and inexpensive to manufacture or repair, light-running, and of such arrangement of parts as to insure at all times a thorough, effective, and uniform delivery of the seed, as well as capable of use on soft or any other ordinary soil, with like results in any cases.

To accomplish this the invention involves certain novel and useful arrangements of parts, details of construction, and peculiarities of operation, all of which will be hereinafter first fully described, and then pointed out in the claims.

In the accompanying drawings, forming part of this specification, Figure 1 is a central longitudinal section and partial elevation of an apparatus constructed in accordance with my invention and embodying my improvements. Fig. 2 is a plan or top view, and Fig. 3 a vertical cross-section through line $x\,x$ of Fig. 1.

In all these figures like letters of reference wherever they occur indicate corresponding parts.

The horizontal frame A, which may be made of wood or iron, carries the axis of the traveling wheels, the hopper for containing the seed, and the guiding-handles H H and standards B B, all of which, when assembled, may be said to constitute the foundation of the machine.

The traveling wheels C C are so mounted upon their axis D as that they may move independently thereon or both together, thus insuring at all times and under all conditions of soil a motion in one or both, which is desirable in order to keep the seed constantly stirred up and in a condition to be delivered into the ground without hindrance.

The seed-hopper envelops the upper parts of both wheels, and is provided with inwardly-inclined ends and bottom to convey the seed upon the inner peripheries of the flanges of the traveling wheels. A partition-casing, E, is located in the upper portion of the hopper, and serves to cover the upper portions of the traveling wheels, and to prevent the escape of the seed from the hopper, except through the opening formed between its converging bottom parts. The traveling wheels open in the center, as shown. Each has a broad flange, $a$, surrounding the opening and receiving the seed from the hopper, and each has a broad flange, $b$, affording an extended bearing upon the soil. The inner edges of flanges $a$ are separated a little distance from each other, forming an intermediate space, I, through which the seed is allowed to fall upon the ground, the feed being regulated as will be hereinafter explained.

The central openings in the traveling wheels have each any desired number of spokes, $c\,c$, serving the usual purposes of connecting the wheels with the axis, and the further important office of keeping the mass of seed within the openings in the wheels completely stirred up, so that the danger of clogging or otherwise interfering with the free delivery is entirely obviated. These spokes constituting the stirrers are compelled to move precisely in accordance with the movements of the wheels, and do not add anything to the draft of the implement sufficient to render it impracticable, as in other forms of stirrers requiring an increased velocity with respect to the driving-wheels.

The frame A also supports the sower $d$ at some convenient point, the same consisting of a curved piece extending into the space between the traveling wheels, outside of the flanges a, being curved to correspond with the size of the flanges, and extending from a point convenient for access of the driver to nearly the bottom point of the wheels or point of contact with the ground. In front of the frame is also a curved piece, e, likewise supported on the frame and extending into the space between the two wheels, outside the flanges a, forming a barrier against the passage of the seed except through the space between the ends of the two curved parts d and e. This space is made conveniently adjustable for regulating the feed, both d and e being suitably hinged or pivoted on the frame, so that they may be moved at pleasure. Under ordinary circumstances the sower d will suffice for effecting all the adjustments required, and the part e may be allowed to remain where set.

The opener G is located in the path of the space between the two wheels, and may be regulated at pleasure as to depth of cut required and angle of inclination, for which purpose it is pivoted to the front of the frame. The traveling wheels move upon the edges of the cut formed by the opener, the seed is dropped therein, and the coverer K closes the cut as it passes over it. This coverer K, in order that it may be of simple form and construction, is shown to consist of a simple inclined and beveled-edge strip attached to the bottoms of the legs of the implement. It thus affords the desired strengthening connection between the two legs and accomplishes all the offices for which it is intended. The coverer might, however, be made in the usual form and connected in any suitable manner to a cross-piece between the two legs or some other convenient part of the implement.

It has not been deemed necessary to illustrate any means of attaching the draft animal or animals, as such connections are well understood and may be provided in any form most convenient. A simple form of clevis at the projecting forward end of the frame will answer all the requirements.

When constructed and arranged to operate substantially in accordance with the foregoing explanations the improved implement is found to admirably answer the several purposes or objects of the invention, as previously stated.

The invention is to be distinguished from such apparatuses as employ driving-wheels requiring a complicated seed distributing or dropping arrangement, and particularly designed for dropping the seeds at regular intervals of time.

It will be observed that in accordance with my improvements the opening for the passage of the seeds is located between the two flanged wheels, and is made adjustable in size by a simple movement of the one adjusting device, which cannot be accomplished in respect to a series of feed-openings. No other agitating device is required than the spokes of the two wheels, whereas if the wheels be made solid extra appliances for the purpose are necessary.

Having now fully described my invention, what I claim as new and desire to secure by Letters Patent, is—

1. In a seed-planter of the character herein specified, the two traveling wheels separated by a little distance and receiving the seed through their central openings to be dropped between the wheels, substantially as shown and described.

2. In a seed-planter of the character herein specified, the two traveling wheels located within the hopper and provided with spokes in their central open portions operating as stirrers for the seed, said wheels being arranged to direct the seed down through the space between them, substantially as shown and described.

3. In combination with the seed-hopper, the two centrally-disposed traveling wheels having open central parts for the passage of the seed, the same being mounted upon the axis and movable independently of each other, substantially as shown and described.

4. In a seed-planter, the two traveling wheels having broad bearing-flanges on their outer circumferences and inner flanges surrounding the central openings in said wheels, for the purposes and objects named.

5. The frame A, carrying the seed-hopper, and the traveling wheels working therein, for the delivery of the seed, the two curved arms, d and e, and the guiding-handles, combined and arranged to operate substantially in the manner set forth.

6. The combination, as before set forth, of the opener, the frame supporting the hopper, the two open traveling wheels, flanged as explained, the curved arms projecting into the space between the two wheels, and the coverer, substantially as shown and described.

In testimony that I claim the foregoing I have hereunto set my hand in the presence of two witnesses.

CYRUS MARSH.

Witnesses:
JNO. M. BOGGS,
SAML. MADACK.